United States Patent [19]

Schilte

[11] 4,095,397
[45] Jun. 20, 1978

[54] BLISTER SEALING MACHINE PLATE MEANS

[76] Inventor: Hank John Schilte, 9 Burton Ct., Bayswater, Victoria, Australia

[21] Appl. No.: 774,484

[22] Filed: Mar. 4, 1977

[30] Foreign Application Priority Data

Mar. 17, 1976 Australia .............................. PC5241

[51] Int. Cl.² ........................ B65B 7/28; B65B 51/10
[52] U.S. Cl. ....................................... 53/329; 53/373; 156/583
[58] Field of Search ............. 53/329, 373; 93/DIG. 1; 156/289, 583

[56] References Cited

U.S. PATENT DOCUMENTS

| | | | |
|---|---|---|---|
| 2,714,416 | 8/1955 | Fener | 93/DIG. 1 |
| 3,170,275 | 2/1965 | Rohdin et al. | 53/329 X |
| 3,699,305 | 10/1972 | Reenstra et al. | 53/373 X |

Primary Examiner—Travis S. McGehee
Attorney, Agent, or Firm—Gerald J. Ferguson, Jr.; Joseph J. Baker

[57] ABSTRACT

A blister sealing machine plate means is disclosed wherein a heater element which extends around the periphery of an opening therein, in which blisters are received, is maintained co-planar with the surface of the plate means at all times. Expansion or contraction of the heater element does not cause warping of the heater element as it is always maintained co-planar with the surface of the plate means by a heat permeable covering which extends over the plate means and the heater element because the covering on both sides of the heater element is bonded to the plate means.

5 Claims, 3 Drawing Figures

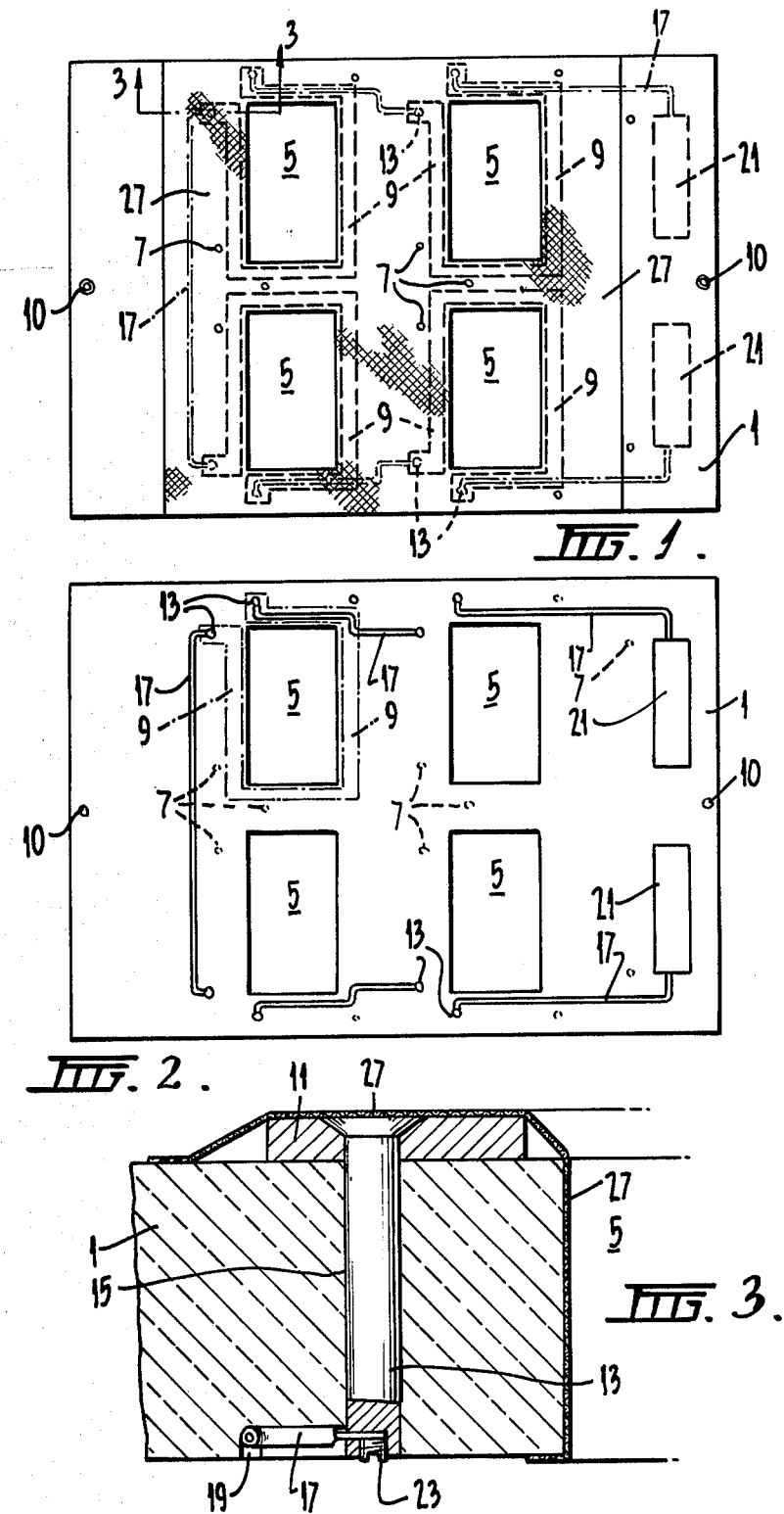

BLISTER SEALING MACHINE PLATE MEANS

BACKGROUND OF THE INVENTION a. Field of the Invention

This invention relates to improvements in blister sealing machines and in particular to improvements in blister sealing machines of the type disclosed in Australian patent application No. 67,582/74 in the name of Hobosch Pty. Ltd., which are used to heat seal packaging where a product is to be held on a backing, such as of cardboard, by means of a formed member (blister) such as of transparent material adapted to over-lie the article. The improvement concerns the way of mounting of heating means on a plate member which is used to support the formed member (blister) and the backing while the two are heat sealed together.

b. Description of Prior Art

In known blister sealing machines such as disclosed in U.S. Pat. No. 3,170,275 to Rohdin et al. sheet like heater elements are rigidly held over their entire length to a plate member which supports the packaging components during sealing. Generally such plate member has a plurality of rectangular openings therein which receive a formed member (blister) of generally rectangular cup shape, and peripheral flanges on the formed members extend over the heater elements which surround the periphery of the rectangular openings. During manufacture of the plate means Teflon (Registered Trade Mark) impregnated glass cloth or like material is first glued to the plate members so as to cover all surfaces. The heater elements of strip sheet material are then glued to the Teflon (Registered Trade Mark) impregnated material about the periphery of the openings and then a further sheet of Teflon (Registered Trade Mark) impregnated material is glued over the first sheet and to the heater elements. The Teflon (Registered Trade Mark) material coatings are used so that during sealing of the packaging components, they will not bond to the plate means.

It has been found that when the heater elements are used, they expand considerably and because they are rigidly held to the plate means over their whole length by the glue on the Teflon (Registered Trade Mark) material, they tear free in certain areas and they then buckle considerably. Sealing of the package components with buckled heater elements is undesirable because not only does it result in uneven sealing around the periphery of the packaging but it prevents correct alignment of the former member (blister) with respect to its backing as the buckled heater elements usually extend above the height of locating pins on the plate member. Such locating pins are used to align the packaging components with one another over the heater elements. This in turn reduces productivity as considerable time must be spent by operators to correctly align the components.

OBJECT OF THE INVENTION

It is an object of the present invention to provide a plate member with the heater elements mounted thereon in such a way that the likelihood of buckling thereof is reduced.

STATEMENT OF THE INVENTION

According to the present invention there is provided a blister sealing machine plate means which enables heat sealing of packaging components said plate means including an electric heater element of sheet material arranged to extend around a path defining the region of heat sealing required, a heat permeable covering material extending over the heater element and held to said plate means on both sides of the path of said electric heater element, said material holding the heater element to said plate means, the assembly being characterised in that when the heater element is heated it can expand and move underneath said material and always be held substantially co-planar with said plate means thereby.

DESCRIPTION OF DRAWINGS OF PREFERRED EMBODIMENT

In order that the invention may be more readily understood a preferred embodiment will now be described with reference to the accompanying drawings wherein:

FIG. 1 is a top plan view of a plate means on which the heaters are mounted;

FIG. 2 is an underneath plan view of the plate means shown in FIG. 1;

FIG. 3 is a close-up sectional view through the plate means of FIG. 1 showing the method of fastening of the heater to the plate means.

DESCRIPTION OF THE PREFERRED EMBODIMENT

A plate means of Bakelite (Registered Trade Mark) of approximately 1 cm. thickness is provided with two screw holes 10 at opposite ends. The screw holes 10 are used to enable quick fastening by screws to conveyor chains which move the plate means under a platten where pressure can be applied thereto whilst the packaging components are compressed together thereby, and heat glued to one another.

Each plate means 1 has four rectangular openings 5 therein in which the formed members (blister) of the packaging are located. The openings 5 approximately correspond to the size of the blisters and can have other shapes to rectangular as for example circular, elliptical, triangular, etc., to suit the blister shape. Pins 7 are located around each of the openings 5 and are spring biased so that they can be depressed into the plate means 1 so as to be approximately flush with the top thereof when under the platten. The pins 7 extend above the top of the plate means 1 a small distance only and are used to locate the backings of the packages centrally over the openings 5.

Heater element 9 are cut from stainless steel sheet material of 0.5 mm. thickness and are positioned around the periphery of the openings 5 and are of generally the same shape thereas. Each end 11 of the heater element 9 has a portion directed outwardly of the centre thereof and is used for fastening of the element 9 to the plate means 1 with a bolt 13 with a counter sunk head which screws into a hole 15 appropriately located in the plate means 1. The bolts 13 locate and securely hold the ends of heaters 9 so that the heater elements are located in position about the openings 5.

Each of the heater elements 9 is electrically connected in series by wiring 17 in channels 19 in the underneath side of the plate means 1. The wiring 17 terminates at one side of the plate means 1 with elongate contacts 21 glued on the underneath face thereof.

The wiring 17 is fastened to the heater elements 9 by passing through an opening in the side of the bolts 13 and by being clamped to the bolts by grub screws 23 in the ends thereof (see FIG. 3). Desirably the wiring 17 is insulated in the channels 19 as shown. The wiring is fastened to the contacts 21 by soldering.

A sheet of CHEMLON (Registered Trade Mark) self-adhesive P.T.F.E. coated glass fabric 27 of a width which covers all the openings 5 is then glued to the plate means 1. The fabric 27 is cut so that it extends down the sides of the openings 5 and is glued thereto.

It is to be noted that the fabric glues to the heater elements 9 as well as to the plate means 1, however, when the plate means is first used, the heat generated by the heater elements 9 destroys or reduces the bonding of the material 27 over the elements 9 without destroying the bonding to the plate means 1. It will then be appreciated that as heater element 9 expands it is held flat against the plate means, by the material 27. This can be best appreciated by observing FIG. 3.

In use, electrical energy is fed to the contacts 21 by electrical contacts in the sealing machine which locate therewith when the plate means 1 is correctly registered under the platten therein.

As shown in the drawings, the bolts 13 hold each end of the heater element 9 rigidly to the plate means 1 and hold the elements generally centrally about the openings 5. Thus even though the heater elements 9 are rigidly held to the plate means 1 they are free to expand in the plane of plate means 1 the always being held co-planar therewith by the material 27.

I claim:

1. A blister sealing machine plate means which enables heat sealing of packaging components, said plate means comprising:

a. an electric heater element of sheet material arranged to extend in a path around an opening in said plate means, said opening having sides adapted to receive said blister when said plate means is in use, and b. heat permeable covering material having contact adhesive on the faces thereof extending over said heater element and secured to said plate means on both sides of said path of said heater element, said adhesive being heat destructable substantially adjacent said heater element to enable said heater element to expand and move underneath said material and be held by said material substantially co-planer with said plate means, and said covering material extending down and secured to said sides of said opening to facilitate insertion and removal of said blisters from said opening.

2. A plate means as claimed in claim 1 further characterised in that the material is a P.T.F.E. impregnated glass fabric.

3. A plate means as claimed in claim 1 further characterised in that each end of the heater element is rigidly held to said plate means by a bolt member which passes through to the underside thereof, and where electric wiring for the heater element is on the underneath side and connects with said bolt members and electric contact members also on the underside.

4. A plate means as claimed in claim 1 further characterised in that depressible container packaging locating pins are located about the heater element for holding the container packaging aligned therewith.

5. A plate means as claimed in claim 1 further characterised in that the heater element is of sheet metal of stainless steel.

* * * * *